(12) United States Patent
Kamitani et al.

(10) Patent No.: US 8,508,104 B2
(45) Date of Patent: *Aug. 13, 2013

(54) PIEZOELECTRIC ACTUATOR DRIVER CIRCUIT

(75) Inventors: Gaku Kamitani, Kyoto (JP); Toshinari Tabata, Otsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,774

(22) Filed: Aug. 1, 2012

(65) Prior Publication Data

US 2012/0293041 A1  Nov. 22, 2012

Related U.S. Application Data

(63) Continuation of application No. 12/883,356, filed on Sep. 16, 2010, now Pat. No. 8,283,836.

(30) Foreign Application Priority Data

Sep. 18, 2009  (JP) ................. 2009-218188

(51) Int. Cl.
*H02N 2/06* (2006.01)
*H02N 2/00* (2006.01)
(52) U.S. Cl.
CPC .................... *H02N 2/008* (2013.01)
USPC ........................................................ 310/317
(58) Field of Classification Search
CPC .................................................... H02N 2/008
USPC ......................................................... 310/317
See application file for complete search history.

(56) References Cited

U.S. PATENT DOCUMENTS

| 4,692,649 | A | * | 9/1987 | Izukawa et al. ......... 310/316.02 |
| 5,675,296 | A | | 10/1997 | Tomikawa |
| 6,380,816 | B1 | | 4/2002 | Okaguchi |
| 2006/0038858 | A1 | * | 2/2006 | Ishizaki ......................... 347/68 |

FOREIGN PATENT DOCUMENTS

| CN | 1141429 A | 1/1997 |
| CN | 1264217 A | 8/2000 |

OTHER PUBLICATIONS

Kamitani et al.; "Piezoelectric Actuator Driver Circuit"; U.S. Appl. No. 12/883,356, filed Sep. 16, 2010.

* cited by examiner

*Primary Examiner* — Derek Rosenau
(74) *Attorney, Agent, or Firm* — Keating & Bennett, LLP

(57) ABSTRACT

In a piezoelectric actuator driver circuit, a resistor provided to detect current is inserted in a current path for a piezoelectric actuator. A signal of a decreased voltage of the resistor is subjected to positive feedback to an amplifier circuit via a band-pass filter. An output signal of the amplifier circuit is subjected to negative feedback to the amplifier circuit via a band-elimination filter. The band-pass filter allows a signal of a fundamental resonant frequency of a piezoelectric device, which includes the piezoelectric actuator, to pass therethrough, and the band-elimination filter blocks the signal of the fundamental resonant frequency. Thus, a loop gain at a higher-order resonant frequency with respect to the fundamental resonant frequency becomes very low and a higher-order resonant mode can be effectively suppressed.

8 Claims, 10 Drawing Sheets

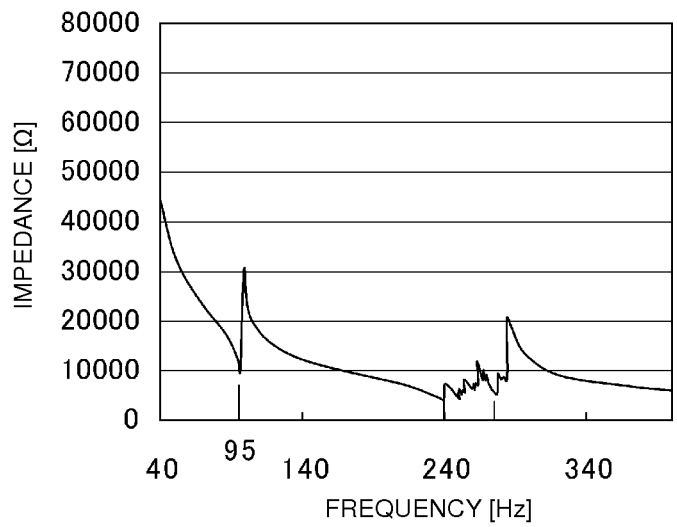
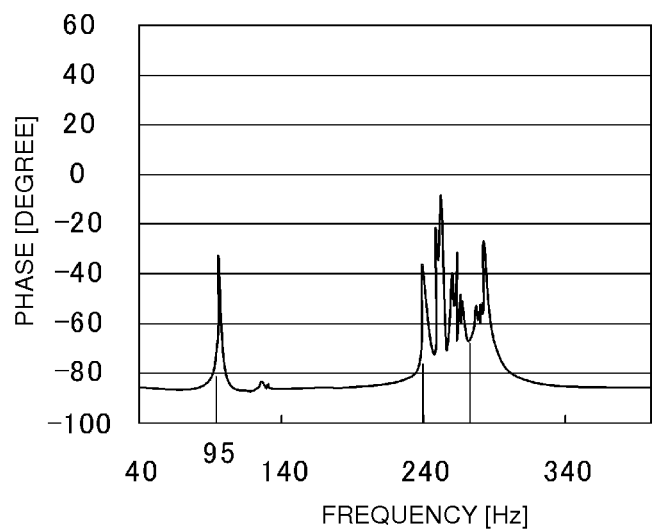

PIEZOELECTRIC ACTUATOR DRIVER CIRCUIT

BACKGROUND OF THE INVENTION

1. Field of the Invention

The present invention relates to a driver circuit for a piezoelectric actuator for vibrating a vibration body.

2. Description of the Related Art

Piezoelectric actuators typically include an electrode provided on a material having a piezoelectric effect, such as PZT ceramics, and are basically voltage driven devices. In other words, mechanical deformation occurs in response to a voltage applied to a piezoelectric actuator, and the piezoelectric actuator typically must be resonantly driven. Resonant driving is a driving scheme in which a piezoelectric actuator or a structure coupled therewith, hereinafter, referred to as "piezoelectric device," causes a resonance phenomenon at a specific frequency determined by its mechanical shape and dimensions, thereby obtaining increased deformation which cannot be obtained by normal voltage application.

In order to perform resonant drive, it is only necessary to apply an alternating voltage at a resonant frequency of a piezoelectric device. For example, it is only necessary to connect an oscillator circuit, which generates an alternating voltage at the resonant frequency, to a piezoelectric device via a power amplifier.

However, individual differences between resonant frequencies of piezoelectric devices occur due to manufacturing variations of piezoelectric devices and inaccuracies in the mounting location of piezoelectric actuators on vibration bodies. Thus, it is difficult to resonantly drive a piezoelectric device merely by applying an alternating signal having a fixed frequency determined previously for the piezoelectric device. In addition, adjusting the frequency of an alternating voltage applied to an individual piezoelectric device has been considered. However, the resonant frequency of a piezoelectric device greatly changes with temperature changes, and thus, it is difficult to stably resonantly drive a piezoelectric device even by with such measure.

Therefore, in the related art, a circuit has been proposed which operates to automatically determine the resonant frequency of a piezoelectric device and to generate an alternating signal at the frequency and performs resonant drive with self-excited vibration. As one example, an electrode and a terminal arranged to detect a deformation amount are provided in a piezoelectric actuator to define a three-electrode piezoelectric actuator, and a driver circuit is arranged such that a drive signal is subjected to positive feedback to the piezoelectric actuator by a signal from the terminal arranged to detect a deformation amount. In other words, this is a method in which the piezoelectric actuator is controlled and driven such that its deformation amount is maximized.

However, a method of manufacturing such a three-electrode piezoelectric actuator is complicated and the cost is high. Further, in a piezoelectric actuator having a large amplitude of vibration, a large amount of distortion occurs between a drive portion which deforms to a large extent and a portion at which an electrode arranged to detect a deformation amount, which does not autonomously deform, is provided. Thus, the piezoelectric actuator is likely to be damaged.

When a two-electrode piezoelectric actuator is used which does not include the electrode arranged to detect a deformation amount, a circuit configuration can be used in which the piezoelectric actuator is incorporated into a resonance system of a driver circuit, such that the frequency of an alternating voltage applied to the piezoelectric actuator is controlled to match the actual resonant frequency of the piezoelectric actuator.

A known circuit which performs resonant drive with self-excited vibration is disclosed in the Magazine "Fuel Cell", written by Kamiya Gaku, Kurihara Kiyoshi, and Hirata Atsuhiko, published by Fuel Cell Development Information Center, Apr. 30, 2009, VOL. 8, No. 4 2009, P148-151, FIG. 2. FIG. 1 shows a basic configuration of a driver circuit for a piezoelectric actuator, which is shown the Magazine "Fuel Cell", written by Kamiya Gaku, Kurihara Kiyoshi, and Hirata Atsuhiko, published by Fuel Cell Development Information Center, Apr. 30, 2009, VOL. 8, No. 4 2009, P148-151, FIG. 2. A resistor R arranged to detect current is inserted in a current path for a piezoelectric actuator "a". A voltage signal proportional to a current flowing in the piezoelectric actuator "a" is obtained by the resistor R, and driving at a frequency at which the voltage-current phase difference of the piezoelectric actuator "a" is substantially 0° is achieved by an operational amplifier OP to which positive feedback of the voltage signal is provided.

The piezoelectric actuator driver circuit disclosed in the Magazine "Fuel Cell", written by Kamiya Gaku, Kurihara Kiyoshi, and Hirata Atsuhiko, published by Fuel Cell Development Information Center, Apr. 30, 2009, VOL. 8, No. 4 2009, P148-151, FIG. 2, drives the piezoelectric actuator using its self vibration, and thus, the piezoelectric actuator can always be driven at a resonant frequency so as to correspond to variations of the resonant frequency. However, a piezoelectric device includes a plurality of higher-order resonant modes, in addition to a fundamental resonant mode. These resonant modes are provided by vibration generated due to the shape and the size of the vibration body and the vibration of the piezoelectric actuator.

In the circuit shown in FIG. 1, positive feedback is provided at a frequency at which the impedance Z of the piezoelectric actuator "a" shows resistivity, i.e., at a frequency at which the reactance is approximately 0, but positive feedback is provided even at a higher-order resonant frequency other than the fundamental resonant frequency. Thus, higher-order resonant oscillation is likely to occur. In the higher-order resonant oscillation, an oscillating portion cannot be oscillated at a predetermined amplitude, and thus predetermined functions of a piezoelectric device are not achieved. In addition, highly audible noise occurs due to harmonics.

SUMMARY OF THE INVENTION

To overcome the problems described above, preferred embodiments of the present invention provide a driver circuit for a piezoelectric actuator, which is capable of performing stable self oscillation even when vibrating a vibration body which is likely to cause higher-order resonance.

A piezoelectric actuator driver circuit according to preferred embodiments of the present invention includes an amplifier circuit arranged to apply a drive voltage to a piezoelectric actuator which vibrates an vibration body and to input to the piezoelectric actuator a detected signal generated in response to the drive voltage, and a positive feedback circuit arranged to provide positive feedback to the amplifier circuit and including a band-pass filter which allows a fundamental resonant frequency of a piezoelectric device, which includes the piezoelectric actuator provided to the vibration body, to pass therethrough.

The positive feedback circuit, i.e., a positive feedback loop, for the amplifier circuit is the same as a positive feedback circuit for the piezoelectric actuator, which amplifies the voltage of the detected signal and provides positive feedback of the detected signal to the piezoelectric actuator.

Further, a negative feedback circuit arranged to provide negative feedback to the amplifier circuit, may preferably include a band-elimination filter which blocks a signal of the fundamental resonant frequency of the piezoelectric device.

The band-elimination filter may be defined by, for example, a band-elimination filter which resonates at the fundamental resonant frequency.

The vibration body may preferably include, for example, a plurality of blades for a fan, and the band-elimination filter may preferably allow a signal of a higher-order resonant frequency caused by vibration of the plurality of blades to pass therethrough.

According to preferred embodiments of the present invention, even when vibrating a vibration body which is likely to cause higher-order resonance, the vibration body can be stably vibrated at the fundamental resonant frequency.

This is because, by forming a harmonic suppression filter in the positive feedback circuit for the amplifier circuit defined by a band-pass filter which allows the fundamental frequency of the piezoelectric device to pass therethrough, a phase rotation angle around the fundamental resonant frequency can be reduced, which results in allowing the piezoelectric actuator to be driven in a resistive state. In this case, the band-pass filter has a pass band such that the loop gain of the positive feedback is maintained high.

Further, by providing the band-elimination filter, which blocks the signal of the fundamental resonant frequency of the piezoelectric device, in the negative feedback circuit for the amplifier circuit, the loop gain at the higher-order resonant frequency band is suppressed and a higher-order resonant mode is prevented.

Further, since the band-elimination filter blocks the fundamental resonant frequency of the piezoelectric device, the difference (ratio) between the loop gains of the fundamental resonant frequency and the higher-order resonant frequency can be large, and the higher-order resonant mode can be more effectively prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a frequency characteristic diagram of the impedance of a piezoelectric actuator in a state in which a piezoelectric device is provided.

FIG. 4B is a frequency characteristic diagram of the phase of the piezoelectric actuator.

DETAILED DESCRIPTION OF THE PREFERRED EMBODIMENTS

First Preferred Embodiment

Figure 1:
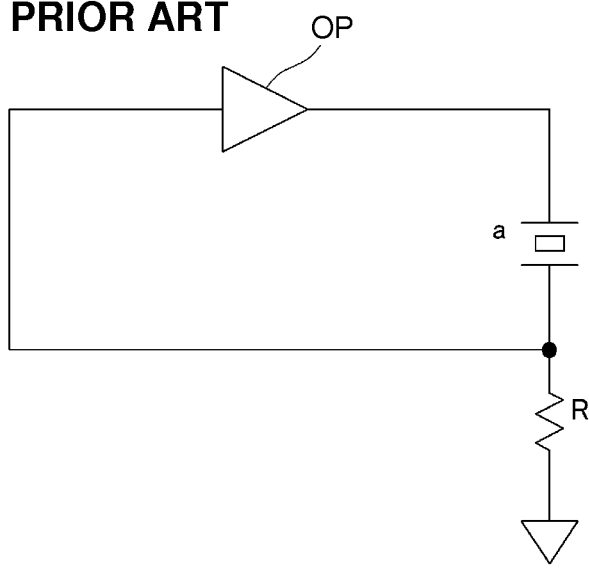
FIG. 1 is a view showing a driver circuit for a piezoelectric actuator, which is disclosed in the Magazine "Fuel Cell", written by Kamiya Gaku, Kurihara Kiyoshi, and Hirata Atsuhiko, published by Fuel Cell Development Information Center, Apr. 30, 2009, VOL. 8, No. 4 2009, P148-151, FIG. 2.
Figure 2:
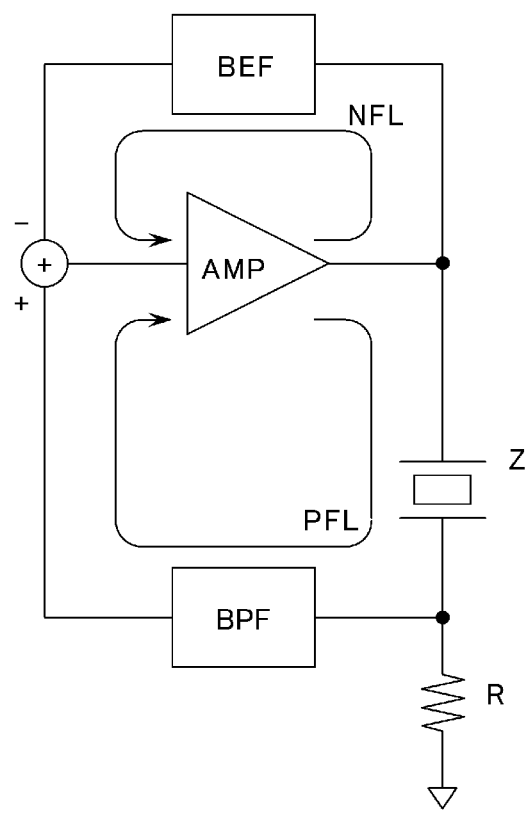
FIG. 2 is a circuit diagram of a piezoelectric actuator driver circuit according to a first preferred embodiment of the present invention.

FIG. 2 is a circuit diagram of a piezoelectric actuator driver circuit according to a first preferred embodiment of the present invention. In a current path for a piezoelectric actuator "a", a resistor R arranged to detect current is provided. A signal of a decreased voltage of the resistor R is subjected to positive feedback to an amplifier circuit AMP via a band-pass filter BPF. An output signal of the amplifier circuit AMP is subjected to negative feedback to the amplifier circuit AMP via a band-elimination filter BEF. In this manner, a positive feedback loop PFL and a negative feedback loop NFL are provided.

The band-pass filter BPF allows a fundamental resonant frequency of a piezoelectric device, which includes the piezoelectric actuator "a" mounted on an vibration body, to pass therethrough, and blocks a higher-order resonant frequency. In other words, the band-pass filter BPF functions as a harmonic suppression filter which blocks a signal of a higher-order resonant frequency of the piezoelectric device. The gain of the amplifier circuit AMP is set such that a loop gain at the fundamental resonant frequency preferably exceeds 1, for example.

The piezoelectric actuator "a" is resistive, i.e., the reactance component is approximately 0, at the resonant frequency of the piezoelectric device. Thus, with a loop gain of approximately 1 or more, positive feedback is provided at the same phase, and thus, the Barkhausen vibration conditions at which the loop gain is approximately 1 or more, and the phase angle is approximately 0° are satisfied and the piezoelectric actuator oscillates at the fundamental resonant frequency.

On the other hand, the band-elimination filter BEF blocks a signal component of the fundamental resonant frequency, and allows a signal component of a higher-order resonant frequency to pass therethrough. Thus, the loop gain at the fundamental resonant frequency does not decrease in the negative feedback loop NFL, and the loop gain at the higher-order resonant frequency sufficiently decreases so as to be less than 1 by the negative feedback of the negative feedback loop NFL. Thus, the Barkhausen vibration conditions are not satisfied at the higher-order resonant frequency, and vibration at the higher-order resonant frequency is prevented.

Figure 3A:
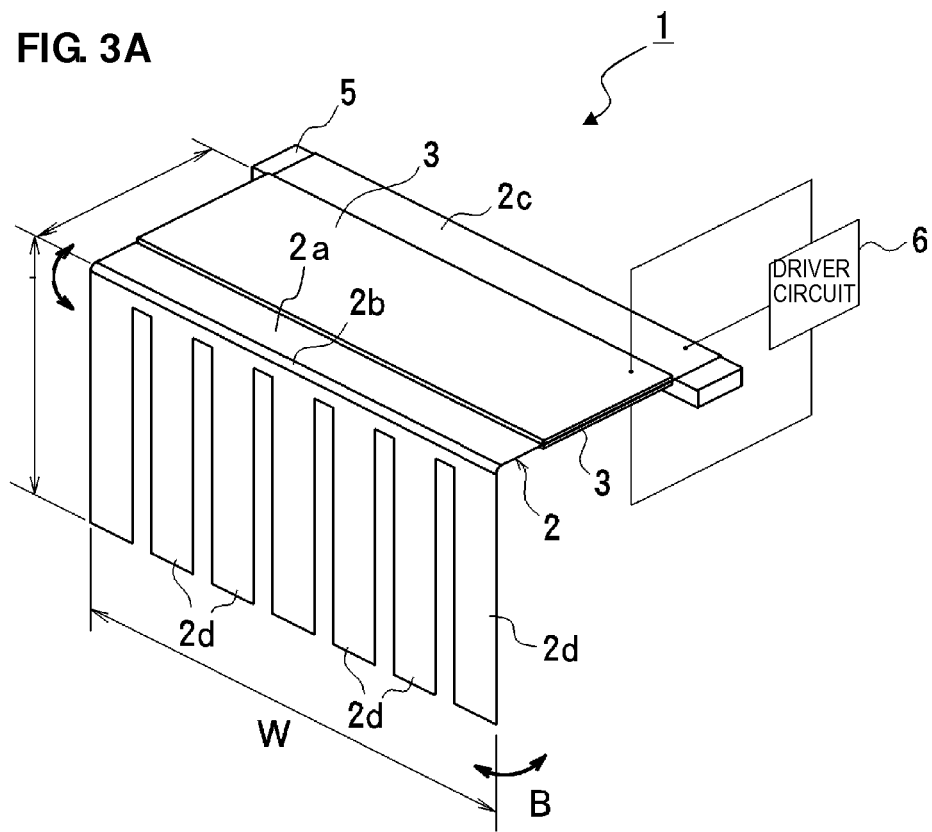
FIG. 3A is a perspective view of a piezoelectric fan which is an example of a piezoelectric device including a piezoelectric actuator.
Figure 3B:
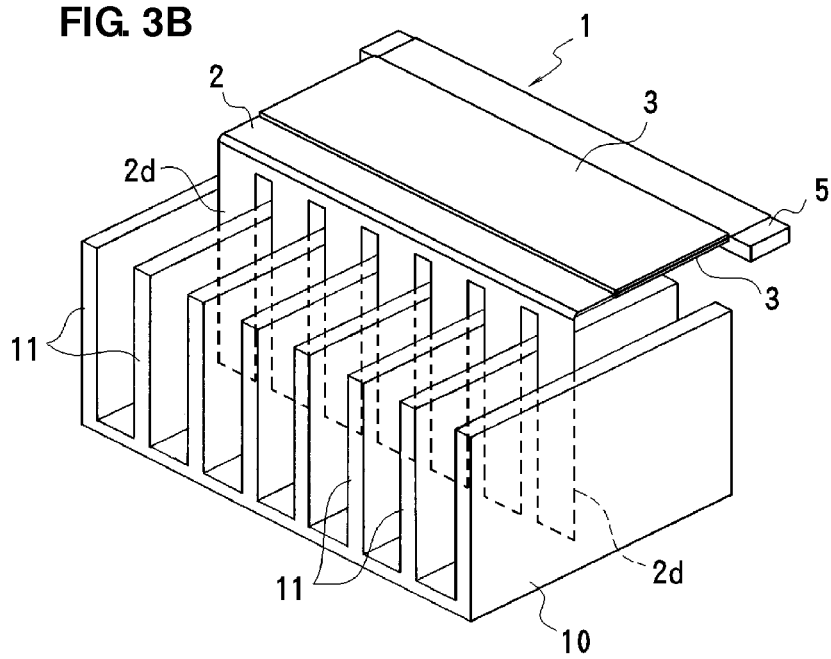
FIG. 3B is a perspective view of a cooling unit including the piezoelectric fan.

FIG. 3A is a perspective view of a piezoelectric fan 1 which is an example of a piezoelectric device including the piezoelectric actuator. FIG. 3B is a perspective view of a cooling unit including the piezoelectric fan 1.

As shown in FIG. 3A, the piezoelectric fan 1 includes a vibration plate 2 which is preferably a thin metal plate, such as a stainless plate, for example. A plate-shaped substrate portion 2a is provided on one edge side of the vibration plate 2 extending in a length direction, and piezoelectric elements 3 are attached to both surfaces of the substrate portion 2a, thereby forming a bimorph piezoelectric actuator. The vibration plate 2 is preferably bent at a bent portion 2b at about 90°. A plurality of blades 2d, for example, seven blades as shown in FIG. 3A, are provided on the other edge side of the vibration plate 2 extending in the length direction.

Each blade 2d extends perpendicular or substantially perpendicular to the principal surface direction of the piezoelectric elements 3. An extension portion 2c, in which the piezoelectric elements 3 are not attached, is provided on the end edge side of the substrate portion 2a of the vibration plate 2, that is, at the edge of the substrate portion 2a opposite to the bent portion 2b. The extension portion 2c is supported by a support member 5 which is fixed to a fixing portion (not shown). The two piezoelectric elements 3 and the vibration plate 2 are electrically connected to a piezoelectric actuator driver circuit 6.

As shown in FIG. 3B, the cooling unit includes the piezoelectric fan 1 and a heat sink 10. The heat sink 10 includes a plurality of radiating fins 11, for example, eight fins as shown in FIG. 3B, which are aligned at intervals. For example, the heat sink 10 is mounted on a top surface of a heat generating element, such as a CPU, which is mounted on a circuit substrate, so as to be thermally coupled thereto.

Each blade 2d of the piezoelectric fan 1 is arranged between each radiating fin 11 perpendicular or substantially perpendicular to a bottom surface of the heat sink 10 in a non-contact manner. The piezoelectric actuator, including the substrate portion 2a of the vibration plate 2 and the piezoelectric elements 3, is arranged so as to be parallel or substantially parallel to and extend along an upper edge of the heat sink 10.

As the vibration plate 2 is vibrated by the piezoelectric actuator, the blades 2d vibrate parallel or substantially parallel to the side surfaces of the radiating fins 11, so as to fan the heat near the radiating fins 11 outward and away from the radiating fins 11. Thus, the heat sink 10 is efficiently cooled.

FIG. 4A is a frequency characteristic diagram of the impedance of the piezoelectric actuator "a" provided in the piezoelectric device shown in FIG. 3B, and FIG. 4B is a frequency characteristic diagram of the phase of the piezoelectric actuator "a".

As shown in FIGS. 4A and 4B, a plurality of resonant points appear, however, the resonant point at the lowest frequency appears at about 95 Hz. Thus, the piezoelectric actuator "a" resonates with a fundamental wave at this frequency. In addition, a plurality of resonant points appear in the range of about 240 Hz to about 280 Hz. These points are thought to be caused by higher-order resonance caused by the vibration of a plurality of the blades 2d shown in FIGS. 3A and 3B. Note that the frequency which actually provides the largest amplitude is slightly greater than this range and is around the frequency at which the phase angle is closest to 0°. In the drawing, the phase is not necessarily sufficiently close to 0°, and this is due to the frequency resolution at measurement being relatively low.

In the positive feedback loop of the circuit shown in FIG. 2, positive feedback is preferably provided at a frequency at which the sum of the phase angle at the fundamental resonant frequency of the piezoelectric device and the phase angle at the central frequency of the passband of the band-pass filter BPF is approximately 0°, for example.

When a piezoelectric actuator, which resonates a plurality of blades, is used as described above, the resonant frequency is different for each blade and thus complex resonant frequencies are likely to be generated. Therefore, preferred embodiments of the present invention are useful for a piezoelectric device having a piezoelectric actuator which resonates a plurality of blades.

Figure 5:
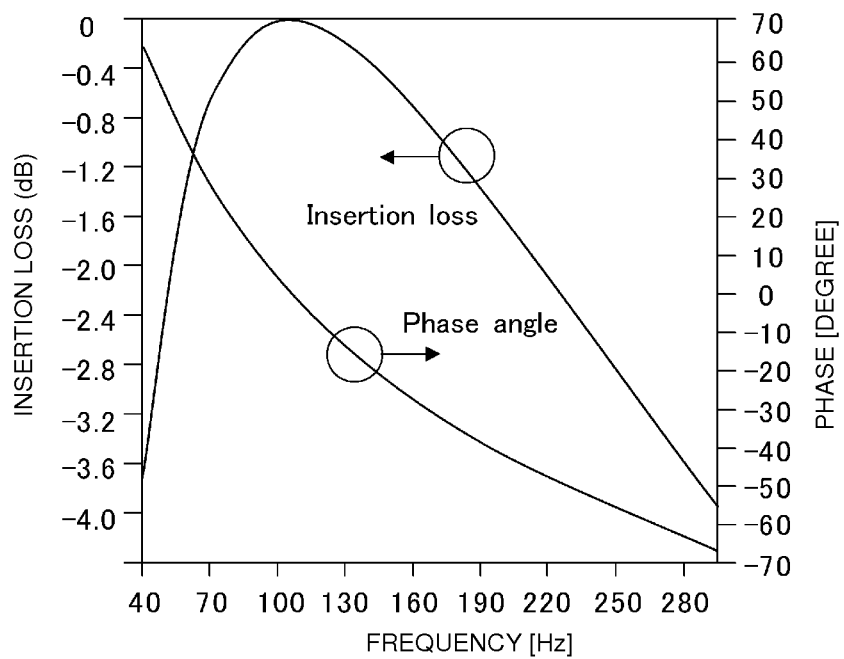
FIG. 5 is a frequency characteristic diagram of a band-pass filter shown in FIG. 2.

FIG. 5 is a frequency characteristic diagram of the band-pass filter BPF shown in FIG. 2. In this example, the insertion loss at higher-order resonant frequencies of about 240 Hz to about 280 Hz is about −3 dB when compared to the insertion loss at the fundamental resonant frequency of about 95 Hz.

The band-pass filter BPF include a CR high-pass filter including a series-connected capacitor and a shunt-connected resistor, and an RC low-pass filter including a series-connected resistor and a shunt-connected capacitor. Thus, the gradient is about −6 dB/oct in a frequency range sufficiently distant from a polar frequency. By providing such a BPF configuration, the phase rotation amount around the fundamental resonant frequency is preferably maintained at about 0°. Actually, the phase is close to 0° in the vicinity of 95 Hz in FIG. 5.

Figure 6A:
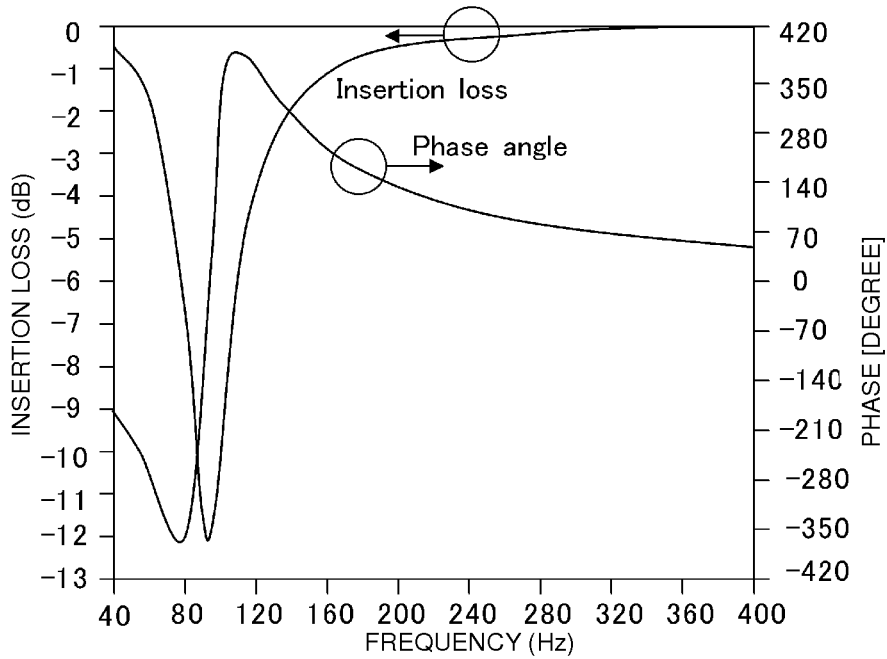
FIG. 6A is a frequency characteristic diagram of a band-elimination filter shown in FIG. 2.
Figure 6B:
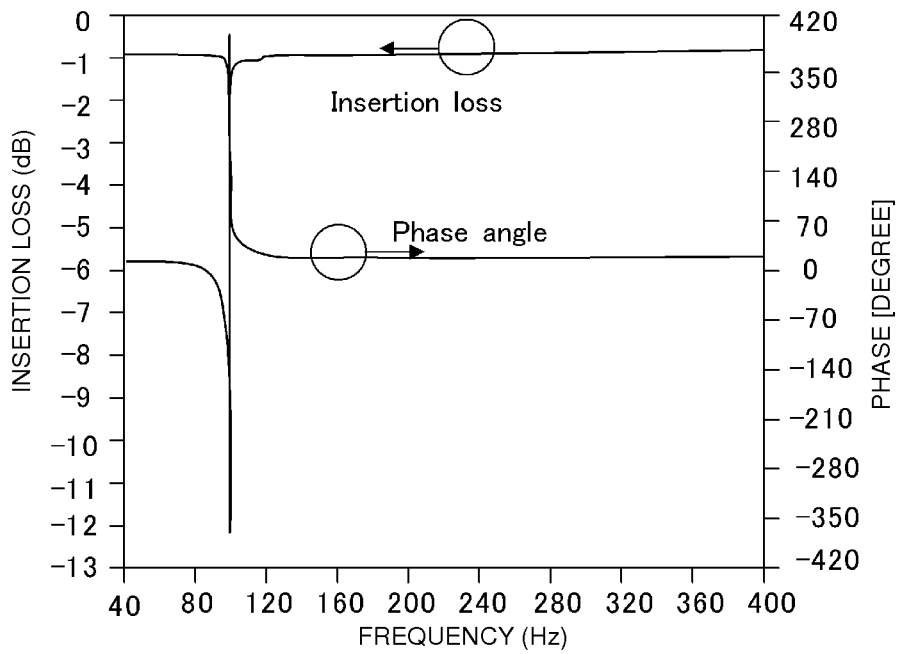
FIG. 6B is a frequency characteristic diagram of another band-elimination filter.

FIG. 6A is a frequency characteristic diagram of the band-elimination filter BEF shown in FIG. 2. FIG. 6B is a frequency characteristic diagram of another band-elimination filter. In FIG. 6A, the attenuation amount at the fundamental resonant frequency of about 95 Hz is about −12 dB, and outstanding attenuation occurs. The insertion loss at higher-order resonant frequencies of about 240 Hz to about 280 Hz is about −0.5 dB or less, which is relatively low. In the example of FIG. 6B, the attenuation amount at the fundamental resonant frequency of about 95 Hz is about −24 dB, and the insertion loss at higher-order resonant frequencies of about 240 Hz to about 280 Hz is about 0 dB.

In this manner, by providing, in the negative feedback loop, the band-elimination filter BEF which allows nearly all of the signal components of the higher-order resonant frequencies to pass therethrough and greatly attenuates the signal component of the fundamental resonant frequency, the loop gain at the higher-order resonant frequencies can be sufficiently decreased so as to be less than 1 while the loop gain at the fundamental resonant frequency is maintained so as to be 1 or more. As a result, the vibration at the higher-order resonant frequencies can be prevented while the stable vibration is maintained at the fundamental resonant frequency.

Second Preferred Embodiment

Figure 7:
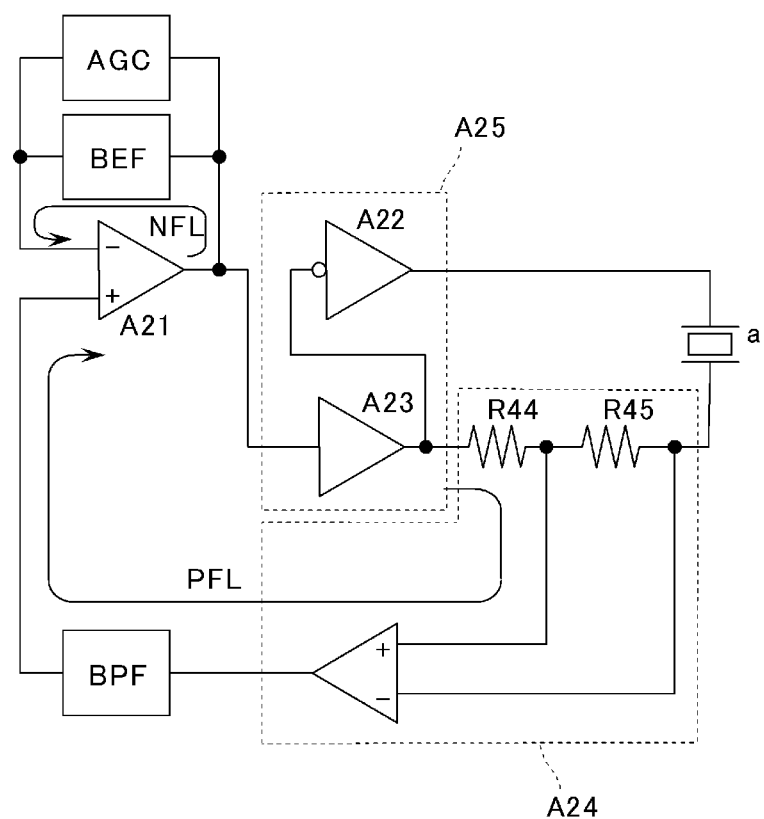
FIG. 7 is a circuit diagram of a piezoelectric actuator driver circuit according to a second preferred embodiment of the present invention.

FIG. 7 is a circuit diagram of a piezoelectric actuator driver circuit according to a second preferred embodiment of the present invention. An amplifier circuit A21 amplifies a signal output from a feedback circuit A24, and supplies the amplified signal to a non-inverting amplifier circuit A23. The non-inverting amplifier circuit A23 amplifies an output voltage of the amplifier circuit A21 with a predetermined gain, and applies the amplified output voltage to a first terminal of the piezoelectric actuator "a" via resistors R44 and R45. An inverting amplifier circuit A22 inverting-amplifies the output voltage of the non-inverting amplifier circuit A23 with a gain of about 1, and applies the inverting-amplified output voltage to a second terminal of the piezoelectric actuator "a". The non-inverting amplifier circuit A23 and the inverting amplifier circuit A22 define a balance driver circuit A25.

The feedback circuit A24 extracts a current, i.e., a detected signal, flowing in the piezoelectric actuator "a" in response to the application of the voltage to the piezoelectric actuator "a", from both ends of the resistor R45, differential-amplifies the current, and supplies the differential-amplified current to a non-inverting input terminal of the amplifier circuit A21.

At both ends of the resistor R45, a voltage proportional to the current flowing in the piezoelectric actuator "a" occurs. The feedback circuit A24 amplifies the voltage between both ends of the resistor R45 and outputs an unbalanced signal. At this time, the output voltage of the feedback circuit A24 is determined such that a positive feedback circuit having a loop gain of more than 1 is preferably provided in the path of A24→A21→A25. In other words, as the current flowing in the piezoelectric actuator "a" increases, the voltage applied to the piezoelectric actuator "a" increases.

A band-elimination filter BEF and an automatic gain control circuit are connected to the negative feedback of the amplifier circuit A21. In the band-elimination filter BEF, the insertion loss of the signal component of the fundamental resonant frequency of the piezoelectric device is high, and the insertion loss of the signal component of the higher-order resonant frequency is low. In other words, the band-elimination filter BEF decreases the loop gain at the higher-order resonant frequency.

The automatic gain control circuit AGC detects an output voltage from an output terminal of the amplifier circuit A21 and controls the amount of negative feedback input to an inverting input terminal of the amplifier circuit A21, so as to cause the voltage applied to the piezoelectric actuator "a" to be constant or substantially constant.

The amplitudes of the output voltages of the non-inverting amplifier circuit A22 and the inverting amplifier circuit A23 are equal or substantially equal to a power supply voltage, and the phases of these voltages are opposite to each other. Thus, the piezoelectric actuator "a" is driven by the voltage which is approximately twice the power supply voltage.

Figure 8:
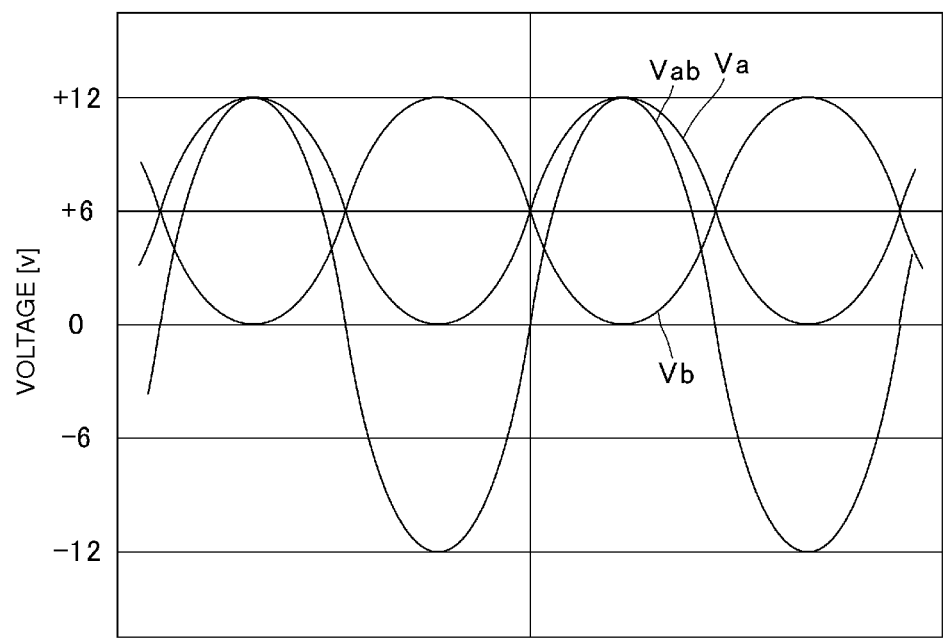
FIG. 8 is a waveform diagram of each of: an applied voltage to a first terminal of a piezoelectric actuator "a" shown in FIG. 7; an applied voltage to a second terminal thereof; and an applied voltage between the both terminals of the piezoelectric actuator.

FIG. 8 is a waveform diagram of each of an applied voltage Va to the first terminal of the piezoelectric actuator "a" shown in FIG. 7, an applied voltage Vb to the second terminal thereof, and an applied voltage Vab between both ends of the piezoelectric actuator "a". The amplifier circuits A22 and A23 preferably operate at a positive supply of about +12 V and at a negative supply of about 0 V, for example, and thus, a voltage in the range of about 0 V to about +12 V is preferably applied to the first terminal A of the piezoelectric actuator "a" and a voltage in the range of about +12 V to about 0 V is preferably applied to the second terminal B of the piezoelectric actuator "a". Therefore, the applied voltage Vab between the both ends of the piezoelectric actuator "a" is (Va−Vb). In other words, about 24 Vp-p is applied as a peak-to-peak voltage.

Figure 9:
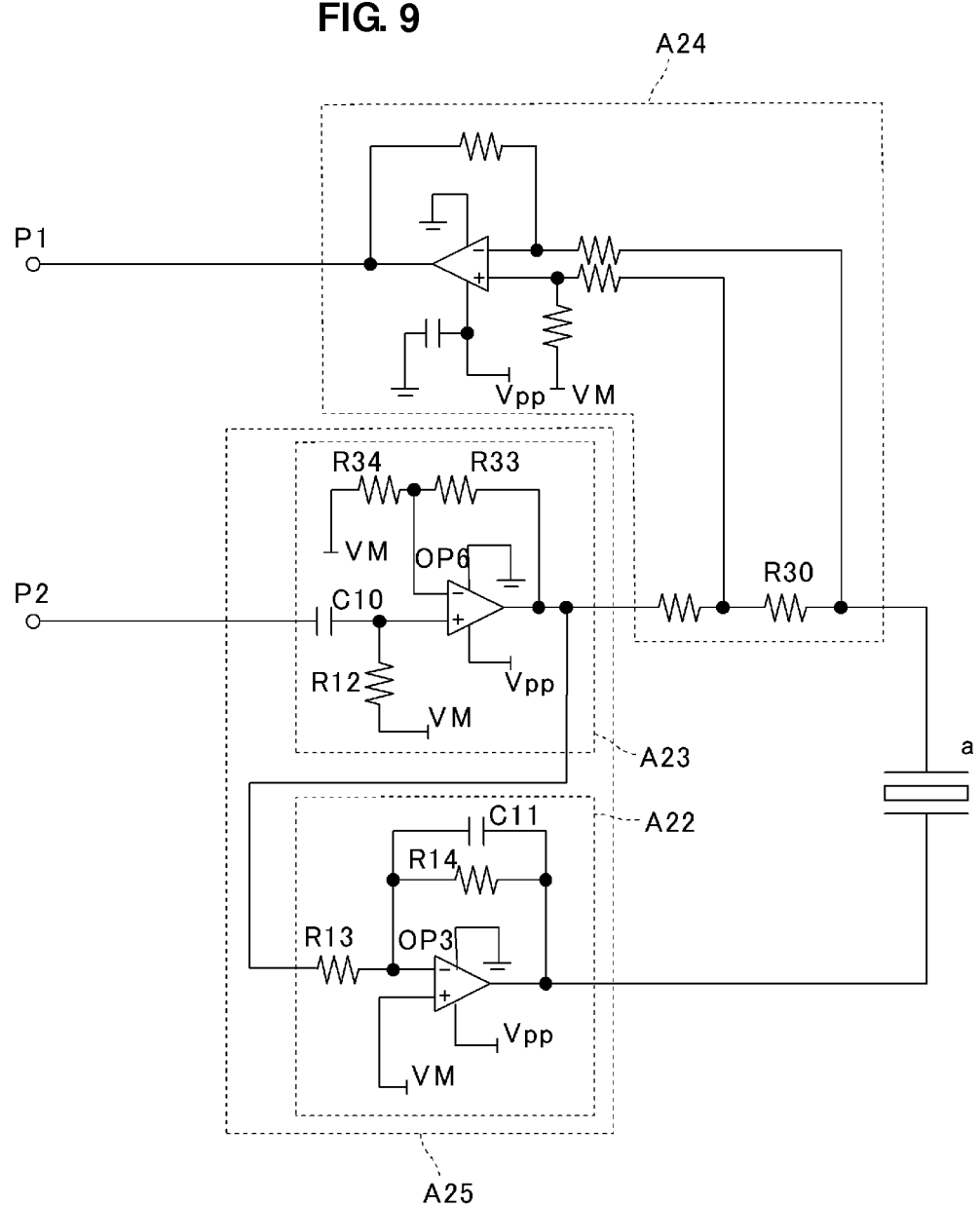
FIG. 9 is a circuit diagram of an inverting amplifier circuit arranged to output a drive voltage to the piezoelectric actuator, a non-inverting amplifier circuit, and a feedback circuit arranged to detect a current flowing in the piezoelectric actuator, in the piezoelectric actuator driver circuit according to the second preferred embodiment of the present invention.
Figure 10:
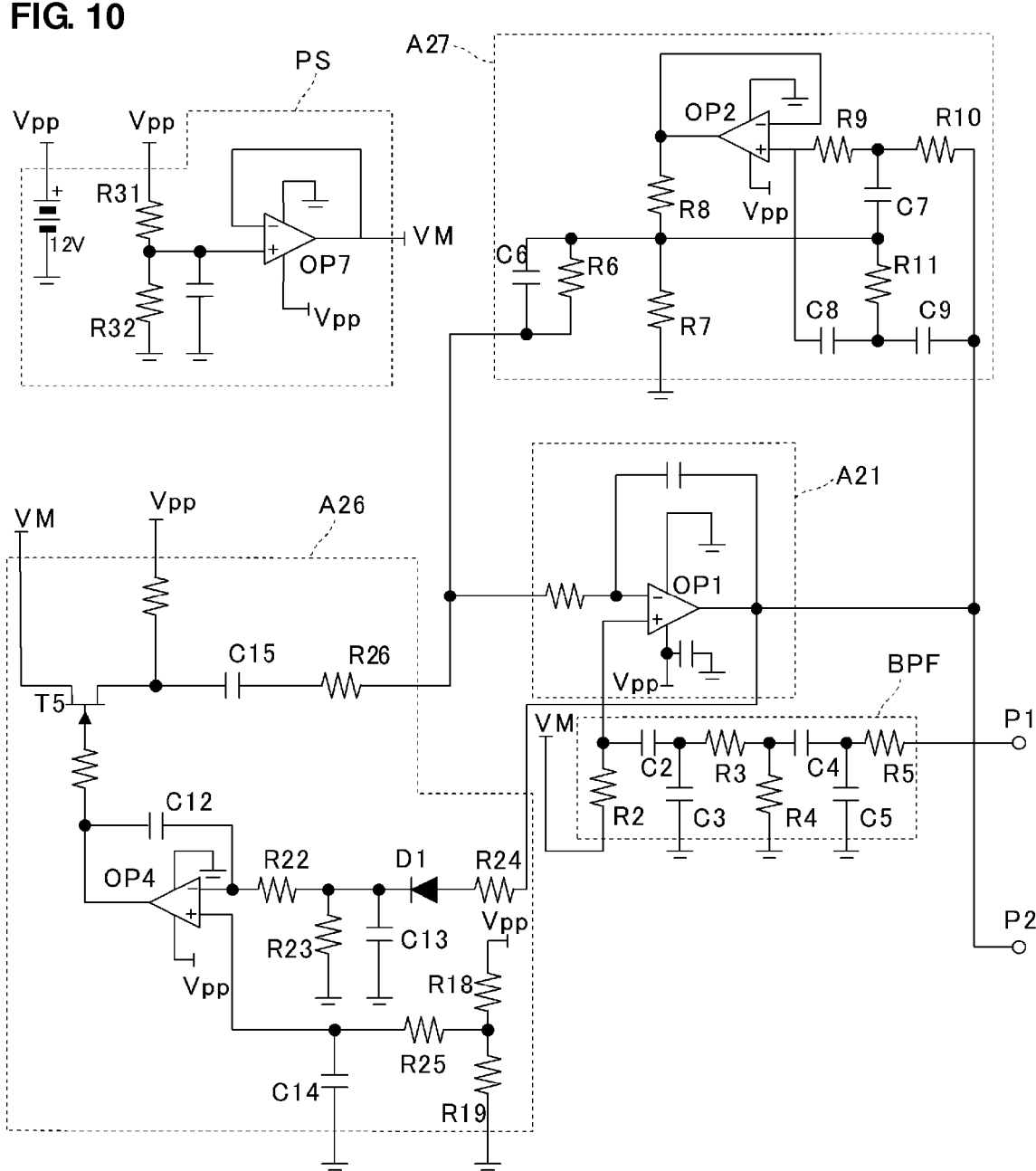
FIG. 10 is a circuit diagram of an amplifier circuit arranged to amplify an output signal of the feedback circuit and to return the output signal to a balance driver circuit, a band-pass filter provided between an input of the amplifier circuit and an output of the amplifier circuit, a band-elimination filter circuit in which a circuit is provided on a negative feedback side of the amplifier circuit, an automatic gain control circuit, and a power supply circuit, in the piezoelectric actuator driver circuit according to the second preferred embodiment of the present invention.

FIGS. 9 and 10 are specific circuit diagrams of the piezoelectric actuator driver circuit shown in FIG. 7. The circuits in FIGS. 9 and 10 are an integral circuit, but the integral circuit is divided into two and shown for convenience of illustration. The circuit in FIG. 9 and the circuit in FIG. 10 are connected to each other at terminals P1 and P2.

FIG. 9 shows the inverting amplifier circuit A22 which outputs a drive voltage to the piezoelectric actuator "a", the non-inverting amplifier circuit A23, and the feedback circuit A24 which detects the current flowing in the piezoelectric actuator "a". The non-inverting amplifier circuit A23 includes an operational amplifier OP6, resistors R12, R33, and R34, and a capacitor C10, and performs non-inverting amplification with a predetermined gain. The non-inverting amplifier circuit A23 non-inverting-amplifies a signal input thereto from the terminal P2, with the predetermined gain, and supplies the non-inverting-amplified signal to the first terminal of the piezoelectric actuator "a".

The inverting amplifier circuit A22 includes an operational amplifier OP3, resistors R13 and R14, and a capacitor C11, and performs inverting amplification with a gain of about 1. In other words, the inverting amplifier circuit A22 inverting-amplifies the output signal of the amplifier circuit A23 at equal or substantially equal amplitude.

The inverting amplifier circuit A22 and the non-inverting amplifier circuit A23 define the balance driver circuit A25. The feedback circuit A24 differential-amplifies a voltage between both ends of the resistor R30, and outputs the differential-amplified voltage to the terminal P1.

FIG. 10 shows the amplifier circuit A21 which amplifies an output signal of the feedback circuit A24 and returns the amplified output signal to the non-inverting amplifier circuit A23 and the inverting amplifier circuit A22, the band-pass filter BPF which is provided between an input of the amplifier circuit A21 and an output of the feedback circuit A24, a band-elimination filter (BEF) circuit A27 in which a circuit is provided on the negative feedback side of the amplifier circuit A21, an automatic gain control (AGC) circuit A26, and a power supply circuit PS.

For example, the power supply circuit PS equally or substantially equally divides a power supply voltage DC12V using the resistors R31 and R32, and inputs a voltage as DC6V to a voltage follower circuit provided by an operational amplifier OP7, thereby generating a stable reference potential VM (e.g., DC6V).

The band-pass filter BPF includes a low-pass filter including a resistor R5 and a capacitor C5, a high-pass filter including a capacitor C4 and a resistor R4, a low-pass filter including a resistor R3 and a capacitor C3, and a high-pass filter including a capacitor C2 and a resistor R2. Each cutoff frequency fc is obtained by $1/(2\Pi RC)$.

The cutoff frequencies of the high-pass filters of two stages are less than the fundamental frequency of the piezoelectric device to which the piezoelectric actuator "a" is mounted. In addition, the cutoff frequencies of the low-pass filters of two stages are greater than the fundamental frequency and less than the frequency of the second harmonic. Therefore, the band-pass filter BPF allows the fundamental frequency to pass therethrough and suppresses harmonic components. In other words, the band-pass filter BPF functions as a harmonic suppression filter to suppress a signal of a higher-order resonant frequency of the piezoelectric device. Thus, the frequency components of harmonics are not subjected to positive feedback, the loop gain in the frequency band of the harmonics is about 1 or less, and vibration does not occur in the harmonics. In other words, vibration occurs at the fundamental frequency of the piezoelectric device to which the piezoelectric actuator "a" is mounted.

Note that, to suppress only the harmonic components, it is only necessary to provide predetermined stages of low-pass filters. However, an RC low-pass filter causes phase delays. Thus, preferably, the phase shift amount is maintained at about 0 by providing the same stages of CR high-pass filters as that of the RC low-pass filters. The phase shift amount is about −45° at the cutoff frequency of a single-stage RC low-pass filter, the phase shift amount is about −90° at a frequency sufficiently greater than the cutoff frequency, the phase shift amount is about +45° at the cutoff frequency of a single-stage CR high-pass filter, and the phase shift amount is about +90° at a frequency sufficiently less than the cutoff frequency, for example. Therefore, by tuning the cutoff frequency of each of the low-pass filters and the high-pass filters to the fundamental resonant frequency, positive feedback can be provided at the fundamental resonant frequency in phase.

The amplifier circuit A21 is an element of a positive feedback circuit, i.e., a positive feedback loop, together with the amplifier circuits A22, A23, and A24 and the piezoelectric actuator which are shown in FIG. 9. In addition, the amplifier circuit A21 is an element of a negative feedback circuit (negative feedback loop) together with the BEF circuit A27 and the AGC circuit A26.

The BEF circuit A27 includes an operational amplifier OP2, resistors R6, R7, R8, R9, R10, and R11, and capacitors C6, C7, C8, and C9. The resistors R9, R10, and R11 and the capacitors C7, C8, and C9 define a band-elimination filter (BEF) preferably using a Twin-T, for example. By non-inverting-amplifying a passing signal of the notch filter, the operational amplifier OP2 causes an attenuation characteristic to be steeper, and decreases an output impedance around a frequency to resonate the piezoelectric actuator. Preferably, the BEF circuit A27 is set such that R9=R10=2*R11 and C8=C9=C7*½, and used in a state where f0=1/(2Π*R11*C7), for example. The amount of feedback to the midpoint of the Twin-T portion is set by R7 and R8. C6 and R6 are arranged to divide the voltage of a signal from the AGC circuit A26, and to adjust a signal which returns to an amplifier circuit A21.

If settings are made such that R9=R10=2*R11 and C8=C9=C7*½, the cutoff frequency of the band-elimination filter (BEF) is obtained by f0=1/(2Π*R11*C7), and is tuned to the vicinity of the frequency for resonating the piezoelectric device to which the piezoelectric actuator "a" is mounted.

An output signal of the BEF circuit A27 is subjected to negative feedback by being input to an inverting input terminal of the operational amplifier OP1 of the amplifier circuit A21. This negative feedback signal is a signal which has passed through the BEF, and thus, only signals other than the fundamental resonant frequency are subjected to negative feedback. As a result, the loop gain at the higher-order resonant frequency is sufficiently suppressed and has a value significantly less than 1, and vibration in harmonic frequencies is prevented. In other words, stable vibration occurs at the fundamental frequency.

The AGC circuit A26 includes a resistor R26, a capacitor C15, and a field-effect transistor T5. By the AGC circuit A26 being further connected to the connection point between the BEF circuit A27 and the amplifier circuit A21, a path of the resistor R6 in the BEF circuit A27→the resistor R26 in the AGC circuit A26→the capacitor C15→the field-effect transistor T5→the reference potential VM, is provided. This path is a variable attenuation circuit in which the resistance value between the drain and the source of the field-effect transistor T5 changes in response to an output signal from an operational amplifier OP4, and thus, the voltage dividing ratio changes in the path of the resistor R6 in the BEF A27→the resistor R26→the capacitor C15→the field-effect transistor T5→the reference potential VM and the attenuation of a negative feedback signal divided between the resistor R26 and the resistor R6 and the capacitor C6 to the amplifier circuit A21 is effectively controlled. In other words, when the resistance value between the drain and the source of the field-effect transistor T5 changes, the voltage dividing ratio between the resistor R6 and the resistor R26 changes, and the amplitude of the negative feedback signal to the amplifier circuit A21 changes.

The operational amplifier OP4 in the AGC circuit A26 functions as a voltage comparator, and a reference voltage generation circuit in which a power supply voltage Vcc is divided by resistors R18 and R19 and a low-pass filter arranged to stabilize a reference voltage, which low-pass filter includes a resistor R25 and a capacitor C14, are connected to the non-inverting input terminal of the operational amplifier OP4. A detector circuit arranged to rectify and detect an output signal from the amplifier circuit A21, which detector circuit includes resistors R23 and R24, a diode D1, and a capacitor C13, is connected to an inverting input terminal of the operational amplifier OP4.

In the operational amplifier OP4, when a detected voltage at the inverting input terminal from the amplifier circuit A21 is greater than the reference voltage at the non-inverting input terminal, the potential of the output decreases. Thus, the resistance value between the drain and the source of the field-effect transistor T5 increases, and the amount of negative feedback to the amplifier circuit A21 increases. Therefore, the loop gain of the amplifier circuit A21 decreases, and the vibration output is suppressed.

On the other hand, in the operational amplifier OP4, when the detected voltage at the inverting input terminal from the amplifier circuit A21 is greater than the reference voltage at the non-inverting input terminal, the potential of the output increases. Thus, the resistance value between the drain and the source of the field-effect transistor T5 decreases, and the amount of negative feedback to the amplifier circuit A21 decreases. Therefore, the loop gain of the amplifier circuit A21 increases, and the vibration output increases. Note that, by providing the resistor R22 and the capacitor C12, a time constant is provided, and thus, a slow operation is performed.

In this manner, the potential at the inverting input terminal of the operational amplifier OP4 is always controlled so as to be equal or substantially equal to the reference potential at the non-inverting input terminal thereof, thereby performing automatic gain control.

Note that, in the first and second preferred embodiments, the drive voltage waveform of the piezoelectric actuator is preferably set so as to be a sine wave. However, by determining the loop gain under the condition that the peak value of a sine wave exceeds the power supply voltage, the piezoelectric actuator may be driven with a trapezoidal wave or a rectangular wave, that is, a waveform in which the peak voltage of the sine wave is clipped. When the occurrence of audible noise at audible frequencies, which is caused by a harmonic component of the trapezoidal wave or the rectangular wave, is a problem, it is preferable to drive the piezoelectric actuator with a sine wave.

While preferred embodiments of the present invention have been described above, it is to be understood that variations and modifications will be apparent to those skilled in the art without departing from the scope and spirit of the invention. The scope of the invention, therefore, is to be determined solely by the following claims.

What is claimed is:

1. A piezoelectric actuator driver circuit comprising:
   an amplifier circuit arranged to apply a drive voltage to a two-electrode piezoelectric actuator which includes only two electrodes and which vibrates a vibration body and to input to the two-electrode piezoelectric actuator a detected signal generated in response to application of the drive voltage; and
   a positive feedback circuit arranged to provide positive feedback to the amplifier circuit and including a band-pass filter arranged to allow a fundamental resonant frequency of a piezoelectric device, which includes the two-electrode piezoelectric actuator attached to the vibration body, to pass therethrough.

2. The piezoelectric actuator driver circuit according to claim 1, further comprising a negative feedback circuit arranged to provide negative feedback to the amplifier circuit and including a band-elimination filter arranged to block a signal of the fundamental resonant frequency of the piezoelectric device.

3. The piezoelectric actuator driver circuit according to claim 2, wherein the band-elimination filter is arranged to resonate at the fundamental resonant frequency of the piezoelectric device.

4. The piezoelectric actuator driver circuit according to claim 2, wherein
the vibration body includes a plurality of fan blades; and
the band-elimination filter allows a signal of a higher-order resonant frequency caused by vibration of the plurality of fan blades to pass therethrough.

5. A piezoelectric actuator driver circuit comprising:
a resistor arranged to detect a current of a current path of a piezoelectric actuator;
an amplifier circuit arranged to apply a drive voltage to the piezoelectric actuator which includes only two electrodes and which vibrates a vibration body and to input to the piezoelectric actuator a detected signal generated in response to application of the drive voltage; and
a positive feedback circuit arranged to provide positive feedback to the amplifier circuit and including a band-pass filter arranged to allow a fundamental resonant frequency of a piezoelectric device, which includes the piezoelectric actuator attached to the vibration body, to pass therethrough.

6. The piezoelectric actuator driver circuit according to claim 5, further comprising a negative feedback circuit arranged to provide negative feedback to the amplifier circuit and including a band-elimination filter arranged to block a signal of the fundamental resonant frequency of the piezoelectric device.

7. The piezoelectric actuator driver circuit according to claim 6, wherein the band-elimination filter is arranged to resonate at the fundamental resonant frequency.

8. The piezoelectric actuator driver circuit according to claim 6, wherein
the vibration body includes a plurality of fan blades; and
the band-elimination filter allows a signal of a higher-order resonant frequency caused by vibration of the plurality of fan blades to pass therethrough.

* * * * *